Patented Oct. 27, 1953

2,657,112

UNITED STATES PATENT OFFICE 2,657,112

THIONATED INDOPHENOL PRODUCTS AND PROCESSES

Ewen D. Robinson and David F. Mason, Mount Holly, N. C., assignors to Southern Dyestuff Corporation, a corporation of North Carolina No Drawing. Application February 26, 1953, Serial No. 339,011

8 Claims. (Cl. 8—37)

This invention relates to liquid indophenol sulfurized dyestuffs and particularly to an improved process of carrying out the thionation step in the production of such dyestuffs whereby a number of highly important commercial advantages are obtained.

Heretofore, in the production of liquid sulfur colors derived from the thionation of indophenol intermediates, the thionation step has been followed by a precipitation and/or filtration operation which produces a filter press cake. The filtration operation was performed to remove the excess polysulfides or their oxidation products such as sodium thiosulfate from the dyestuff and obtain a dyestuff press cake in a reasonably concentrated condition, free from the diluents and polysulfides in the thionation mass. It is well known that losses of color occur in the various operations such as aerations, filtrations and handling of press cakes, either for liquid, paste or powder products. The aeration step itself is often the worst cause of color loss. The filtering and related operations are time consuming and expensive from the labor standpoint, in addition to the product losses incident thereto.

Another disadvantage characteristic of the prior procedures for producing liquid indophenol sulfur dyestuffs is the amount of organic solvent required in such processes and which constitutes a substantial item of expense in the process.

The improved thionation process of the present invention overcomes the above several difficulties by avoiding the necessity of forming a filter press cake and at the same time substantially increasing the yield of dyestuff as well as the concentration of the dyestuff in the liquid solution. Also, by use of the improved thionation process of the present invention, the usual solvent requirement may be reduced as much as 90%. In other words, this improved process requires only about one-tenth of the amount of solvent heretofore required.

Another important commercially advantageous feature of the present invention is the very substantial increase in yield of liquid indophenol sulfurized dyestuff. The yield has been increased as much as 75% or more, which places the process in an entirely different category from an economy standpoint.

Furthermore, the process of the present invention makes possible an appreciable improvement in the concentration of the dyestuff solution. The liquid indophenol dyestuffs produced by the prior processes were limited to a concentration of around 5% to 7%, and the liquid indophenol dyestuffs produced by the improved present process increases the obtainable dyestuff concentration to approximately 10% to 15%; in other words, approximately 100% increase in dyestuff concentration.

The foregoing and other advantages obtainable by the present invention over established prior art commercial processes are made possible by our discovery of using in the thionation step, that is, in the initial formation of the indophenol sulfurized dyestuff as a thionation melt, a chemical compound selected from the group consisting of the sodium sulfonates of toluene, xylene, cymene, dimethyl-aniline, and tetrahydronaphthalene, and chemical equivalents thereof including the corresponding potassium and ammonium sulfonates which possess the property of increasing the solubility of the dyestuff in the liquid ready-to-dye product. A specific compound included in this group which we have found commercially advantageous and which has given excellent results, is sodium xylene sulfonate.

The use of these special compounds in the thionation step is of particular importance for eliminating the usual filter press cake operation and thereby obtaining the important commercial advantages mentioned above. Furthermore, incorporation of these compounds, e. g., sodium xylene sulfonate, in the thionation mass followed directly by preparation of the liquid ready-to-dye dyestuff solution without the usual precipitation and filtering, means that these compounds remain in the final dyestuff solution, and therein provide a substantial improvement in the concentration of dyestuff that will remain in solution. Because of their presence and solubilizing function they make possible a marked increase in the maximum dyestuff concentration and avoid the usual precipitation or "salting-out" of the dyestuff solids. A uniform dyestuff solution of high concentration is thus obtained.

Another aspect of the process of the present invention which should also be recognized is its particular significance with respect to the difficultly soluble indophenol sulfurized dyestuffs. Those dyestuffs have heretofore definitely required the filtering operation and presented the particular problems described above. It is only as a result of the present invention that the difficulties and limitations which characterize those dyestuffs have been overcome and the substantial improvements in yield, concentration of dyestuff, avoidance of press cake formation, and general improvement in quality of the product have been attained.

In the following examples, the formula and thionation process are adjusted so as to yield a fully thionated dyestuff and at the same time produce a fusion mass, which, upon completion of the thionation, may then be processed directly to yield a solution of ready-to-dye indophenol liquid sulfurized dyestuff, omitting the usual steps of precipitation and filtration and handling of press cakes. Another advantage gained by incorporating the special chemical compound in the thionation step is that it is still present after thionation to aid in the later preparation of the ready-to-dye liquid color.

*Example 1.—Indo-Carbon Black—Prototype No. 126*

Charge 240 parts of parahydroxy phenyl beta naphthylamine into 150 parts of water containing 100 parts of the sodium salt of meta xylene sulfonic acid, add 100 parts monoethyl ether of diethylene glycol, 120 parts flake sodium sulfide and 212 parts ground sulfur. Bring to the boil and reflux 24 to 36 hours. This fusion mass is now ready for diluting and standardizing for strength reduction and alkalinity. In the above formula the amount of solvent used is less than 10% of that normally required. It should also be noted that the sulfur content of the formula is considerably less than normal. We have found that most of the sulfur is consumed in the thionation so that large excesses are not present, as in the case in past methods of thionation. The fact that the sulfur is largely consumed in the thionation makes possible the use of the fusion mass in directly preparing the liquid ready-to-dye color. A typical example of a solubilized fusion would be: 150 parts of the above fusion mass diluted with 178 parts water, 12 parts flake sodium sulfide and 80 parts 40% sodium hydrosulfide. A thin, watery liquid is obtained which is a ready-to-dye solution of the color. A 20% dyeing of this color on cotton yields full shades without the addition of any other chemicals, except the salt normally used in exhausting dyebaths of sulfur colors.

*Example 2.—Hydron Blue*

240 parts carbazole indophenol as wet paste are charged into 350 parts monoethyl ether of diethylene glycol, 350 parts sodium salt of meta xylene sulfonic acid, 260 parts flake sodium sulfide and 400 parts sulfur. This mass is slowly heated to the boil and evaporated to a boiling point of 105° C. Reflux at 104–106° C. is continued for 24 to 36 hours. There is obtained a fusion mass which may be used directly in the preparation of a liquid ready-to-dye Hydron Blue color. The liquid color is prepared from the fusion mass in a similar manner as in the example above. This dyestuff dyes both from a caustic soda-sodium hydrosulfite dyebath, as well as from the ready-to-dye sulfide solution of the color. The shade is noticeably greener and brighter than a standard method of production.

*Example 3.—Brilliant Blue—Color Index No. 961*

567 lbs. of phenyl-para-amino-para'-hydroxy-diphenylamine (or its corresponding indophenol) are mixed with 400 lbs. Carbitol, 400 lbs. xylene sodium sulfonate, 300 lbs. chipped sodium sulfide, 500 lbs. ground sulfur and approximately 1600 lbs. water. This mass is heated while stirring and evaporated to 106° C., at which time it is placed under reflux for from 40 to 48 hours. The fusion mass is then ready for solubilizing by the addition of 3,330 lbs. water, 450 lbs. xylene sodium sulfonate, 550 lbs. 50% caustic liquor and 2,360 lbs. 42% sodium hydrosulfide. There results a water-thin solution of brilliant blue sulfur dyestuff which has excellent brightness, greenness of shade, and much leveler dyeing properties than the dyestuff prepared in a conventional way. The production of this color is free from such annoyances as tarring of the dye while thionating. There is no necessity for converting the color to a press cake, unless one desires to produce a powder or paste form of dyestuff. By eliminating the precipitation, filtration, and handling of press cakes, dry powders, etc., and the usual loss of color encountered in precipitations in general, the color yield is usually high. Batches yielding 25,000 lbs. of liquid color may easily be handled as a single batch.

*Example 4.—Hydron Blue G—Color Index No. 971*

This color may be prepared in a similar manner of thionation as described in Example 2. The dyestuff must be applied to goods from a caustic soda-sodium hydrosulfite bath, since the dyestuff does not dye from a sodium sulfide reduction.

*Example 5.—Sulfur Red Brown*

There are a group of intermediates belonging to the p-hydroxy diphenylamine structure, which are used in preparing red browns of goods fastness to washing, chlorine and light. Conventional thionation of these intermediates is with solvents such as butyl alcohol or certain of the alkyl ethers of mono- or diethylene glycol, such as Cellosolve or Carbitol. This group of intermediates lend themselves well to the thionation with the chemical compounds disclosed in this invention. A typical fusion would be to dissolve 150 parts of p-hydroxy diphenylamine in 200 parts water, containing 75 parts Carbitol, 75 parts xylene sodium sulfonate, and 100 parts of 60% sodium sulfide. 175 parts of ground sulfur is now added and the fusion mass is stirred at 90° C. for 2 hours. It is then evaporated to 110–115° C. and refluxed until the desired shade is obtained, as determined by dye tests. The concentrated fusion is a homogeneous liquid, completely free of tar matter and well suited to further processing to a liquid ready-to-dye dyestuff. Examples of similar intermediates that may be used to yield red browns of similar fastness are p-methyl p'-hydroxy diphenylamine; p-(alkoxy) p'-hydroxy diphenylamine, etc.

In the foregoing examples, the chemical compound used for effecting the improved results of this invention is sodium xylene sulfonate, but it is to be understood that this is for illustrative purposes only and that the sodium sulfonates of the other compounds, mentioned hereinabove and chemical equivalents thereof, are to be included in the scope of the present invention, and illustrative examples of which are as follows:

*Example 6.—Indo-Carbon Black*

Similar results are obtained as in Example 1 above if the same amount, that is, 100 parts, of para toluene sodium sulfonate are used instead of the sodium salt of meta xylene sulfonic acid.

*Example 7.—Hydron Blue*

Similar results are obtained as in Example 2 above if the same amount, i. e., 350 parts, of tetrahydronaphthalene sodium sulfonate are used instead of the sodium salt of meta xylene sulfonic acid.

*Example 8.—Brilliant Blue*

Similar results are obtained as in Example 3 above if the same amount, i. e., 400 lbs. of the sodium salt of cymene sulfonic acid are used instead of the xylene sodium sulfonate.

*Example 9.—Sulfur Red Brown*

Similar results are obtained as in Example 5 above if the same amount, i. e., 75 parts, of dimethylaniline sodium sulfonate are used instead of the xylene sodium sulfonate.

For the reasons pointed out above, it is of economic advantage to avoid the formation of a press cake with the attendant filtering operation, by using one of the above-mentioned compounds as a thionation assistant. However, if a press cake has already been formed or is purchased as a starting material for producing the liquid indophenol sulfurized dyestuff, it may be treated either before or during solubilization, with one of the above-mentioned chemical compounds. In this instance the compounds serve as solubilization assistants for the thionation mass. Illustrative but non-limiting examples of such uses in the production of Hydron Blue and Indo-Carbon Black dyestuffs are as follows:

*Example 10.—Hydron Blue*

25 parts of sodium xylene sulfonate were dissolved in 50 parts of water and to it were added 70 parts of press cake obtained by filtering the thionation product of carbazole indophenol and a polysulfide. 70 parts of sodium hydrosulfide (40%) were then added and the entire mass was stirred while being heated to 90° C. to 100° C., at which temperature it was maintained for approximately 1 to 2 hours. The thionation product dissolved completely and the resulting solution was filtered to remove any foreign material. The resulting product was a concentrated liquid solution of the reduced thionation product, completely free of any insoluble matter and adapted for dilution to produce a Hydron Blue dyestuff.

20 parts of this concentrated solution when added to 1500–2000 parts of water yielded a liquid dye which colored 100 parts of cotton a dark blue shade characteristic of Hydron Blue.

*Example 11.—Hydron Blue*

30 parts of sodium p-toluene-sulfonate were dissolved in 75 parts of water and to it were added 70 parts of press cake obtained by filtering the thionation product of carbazole indophenol and a polysulfide. 70 parts of sodium hydrosulfide (40%) were then added and the entire mass was stirred while being heated to 90° C. to 100° C., at which temperature it was maintained for approximately 1 to 2 hours. The thionation product dissolved remarkably well and the resulting solution was filtered to remove any foreign material. The resulting product was a concentrated solution of the reduced thionation product, completely free of any insoluble matter and adapted for dilution to produce a Hydron Blue dyestuff.

*Example 12.—Hydron Blue*

By using 30 parts of sodium metanilate dissolved in 125 parts of water as the reducing assistant, with the same press cake, reducing agents and conditions as in Example 11 above, we obtained a solution which was of 180–190% strength when compared with a liquid color made without the use of the sodium metanilate.

*Example 13.—Hydron Blue*

By using 30 parts sodium cymene sulfonate dissolved in 125 parts of water as the reducing assistant, with the same press cake, reducing agents and conditions as in Example 11 above, we obtained a solution which was of 180–190% strength when compared with a liquid color made without the use of the sodium cymene sulfonate.

*Example 14.—Hydron Blue*

By using 30 parts of urea dissolved in 125 parts of water as the reducing assistant, with the same press cake, reducing agents and conditions as in Example 11 above, we obtained a solution which was of 180–190% strength when compared with a liquid color made without the use of urea.

*Example 15.—Hydron Blue*

By using 30 parts of thiourea dissolved in 125 parts of water as the reducing assistant, with the same press cake, reducing agents and conditions as in Example 11 above, we obtained a solution which was of 180–190% strength when compared with a liquid color made without the use of the thiourea.

*Example 16.—Indo-Carbon Black*

20 parts of sodium xylene sulfonate were dissolved in 25 parts water and to this was added 150 parts of press cake isolated from the thionation mass of 4-hydroxy phenyl beta naphthylamine. 5 parts of chip sodium sulfide were then added and the whole was stirred and heated to approximately 90° C. for 20–30 minutes. To the heated mixture were added 50 parts of a 40% solution of sodium hydrosulfide and the mass was stirred at 90° C. to 95° C. for approximately 30 minutes. The thionation product was completely dissolved and the solution, after filtering to remove any foreign matter, was adapted for dilution to produce an Indo-Carbon Black dyestuff ready for use.

*Example 17.—Indo-Carbon Black*

By using 20 parts of hexamethylenetetramine as the reducing assistant, with the same press cake, reducing agents and conditions as in Example 16 above, we obtained solutions of strength similar to that obtained in Example 16.

*Example 18.—Indo-Carbon Black*

By using 20 parts of sodium metanilate as the reducing assistant, with the same press cake, reducing agents and conditions as in Example 16 above, we obtained solutions of strength similar to that obtained in Example 16.

*Example 19.—Indo-Carbon Black*

By using 20 parts of urea as the reducing assistant, with the same press cake, reducing agents and conditions as in Example 16 above, we obtained solutions of strength similar to that obtained in Example 16.

*Example 20.—Indo-Carbon Black*

By using 20 parts of thiourea as the reducing assistant, with the same press cake, reducing agents and conditions as in Example 16 above, we obtained solutions of strength similar to that obtained in Example 16.

Instead of the sodium sulfonates described in the above examples, other soluble alkaline salts, such as the potassium and ammonium sulfonates, may be used.

This application is a continuation-in-part of our application Serial No. 274,294, filed February 29, 1952, which has now been abandoned in favor of the present application.

The scope of this invention is indicated in the appended claims.

We claim:

1. In the production of indophenol sulfurized dyestuffs the step of thionating the indophenol dyestuff components in the presence of a chemical compound selected from the group consisting of the sodium sulfonates of toluene, xylene, cymene, dimethylaniline and tetrahydronaphthalene.

2. In the production of indophenol sulfurized dyestuffs, the step of thionating the indophenol dyestuff components in the presence of sodium xylene sulfonates.

3. A process for producing indophenol sulfurized dyestuffs in liquid ready-to-dye form comprising thionating the dyestuff components in the presence of a chemical compound selected from the group consisting of the sodium sulfonates of toluene, xylene, cymene, dimethylaniline and tetrahydronaphthalene, to produce a thionation mass, and then solubilizing said mass with water and alkaline sulfides to obtain a ready-to-dye solution of the dyestuff without the necessity of filtering the thionation mass or producing a filter press cake.

4. A process of producing a liquid indophenol sulfurized dyestuff comprising thionating the indophenol dyestuff components in the presence of sodium xylene sulfonate in an amount sufficient to solubilize the dyestuff components and thereby avoid the necessity of filtering the thionation mass, and then adding water and alkaline sulfides to the thionation mass to obtain directly a liquid ready-to-dye solution.

5. An aqueous liquid solution of a water soluble thionated indophenol product containing a chemical compound selected from the group of thionation and solubilizing assistants consisting of the sodium, potassium and ammonium sulfonates of toluene, xylene, cymene, dimethylaniline and tetrahydronaphthalene, and the compounds hexamethylenetetramine, urea and thiourea.

6. A ready-to-dye aqueous solution of a water soluble, sulfurized, reduced, indophenol dyestuff, substantially free of insoluble materials and having a dyestuff concentration in excess of 7%, and containing a sulfide reducing agent and about 3% to 15% of a chemical compound selected from the group consisting of the sodium, potassium and ammonium sulfonates of toluene, xylene, cymene, dimethylaniline and tetrahydronaphthalene and the compounds hexamethylenetetramine, urea and thiourea.

7. A ready-to-dye aqueous solution of a water soluble, sulfurized, reduced, carbazole indophenol dyestuff, substantially free of insoluble materials and having a dyestuff concentration in excess of 7%, and containing a sulfide reducing agent and about 3% to 15% of a chemical compound selected from the group consisting of the sodium, potassium and ammonium sulfonates of toluene, xylene, cymene, dimethylaniline and tetrahydronaphthalene and the compounds hexamethylenetetramine, urea and thiourea.

8. A ready-to-dye aqueous solution of a water soluble, sulfurized, reduced dyestuff selected from the group consisting of indophenols of para-hydroxy phenyl beta naphthylamine, phenyl-para-amino-para'-hydroxy-diphenylamine, p-hydroxy diphenylamine, p-methyl p'-hydroxy diphenylamine and p-(alkoxy) p-hydroxy diphenylamine, substantially free of insoluble materials and having a dyestuff concentration in excess of 7%, and containing a sulfide reducing agent and about 3% to 15% of a chemical compound selected from the group consisting of the sodium, potassium, and ammonium sulfonates of toluene, xylene, cymene, dimethylaniline and tetrahydronaphthalene and the compounds hexamethylenetetramine, urea and thiourea.

EWEN D. ROBINSON.
DAVID F. MASON.

References Cited in the file of this patent

UNITED STATES PATENTS

| Number | Name | Date |
|---|---|---|
| 1,987,583 | Berthold | Jan. 8, 1935 |